(12) United States Patent
Chen

(10) Patent No.: US 6,719,331 B1
(45) Date of Patent: Apr. 13, 2004

(54) TELESCOPIC TUBE WITH WATER SUPPLY

(76) Inventor: Ming Jen Chen, No. 39, Mo Dan Lane, Chao An Li, Lu Kang Chen, Changhua Hsien (TW)

(*) Notice: Subject to any disclaimer, the term of this patent is extended or adjusted under 35 U.S.C. 154(b) by 0 days.

(21) Appl. No.: 10/354,013

(22) Filed: Jan. 30, 2003

(51) Int. Cl.[7] .............................................. F16L 15/02
(52) U.S. Cl. ...................... 285/302; 285/298; 285/391; 239/532
(58) Field of Search .......................... 285/145.2, 145.1, 285/298, 302, 303, 391; 239/532

(56) References Cited

U.S. PATENT DOCUMENTS

| | | | | |
|---|---|---|---|---|
| 2,261,505 A | * | 11/1941 | Schlesinger | 285/298 |
| 4,108,202 A | * | 8/1978 | Schoepe | 285/303 |
| 5,035,257 A | * | 7/1991 | Antunez | 285/303 |
| 5,897,268 A | * | 4/1999 | Deville | 403/109.5 |
| 6,027,087 A | * | 2/2000 | Lindemann et al. | 248/188.5 |
| 6,322,006 B1 | * | 11/2001 | Guo | 285/302 |

* cited by examiner

*Primary Examiner*—David Bochna
(74) *Attorney, Agent, or Firm*—Troxell Law Office PLLC

(57) ABSTRACT

A telescopic tube with water supply is equipped with a minor tube, a major tube that are connected to each other by a tubular coupling device which has a registration end and a connecting section, the former is engaged with one end of the minor tube and the latter is engaged with the top end of the major tube. A guard cap is secured to the top end of the major tube which serves to prevent the minor tube from easy disengagement from the major tube in case of excessive extension adjustment. The connecting section of the tubular coupling device has a cone shaped configuration with a spiral thread track defined thereon and terminates in a stop board. A pair of support halves having tapered inner surface are movably registered with the spiral thread track and are outwardly expanded or retracted as moving against the cone shaped connecting section so that the outer surface of the support halves can be urged against the inner side of the major tube to hold the same in place in length adjustment and vice versa for retraction of the telescopic tube. Thus the telescopic tube can be adjusted of its length and secured in place by simple rotation of the major tube and moving the minor tube to make the adjustment easy, speedy and precise.

7 Claims, 6 Drawing Sheets

TELESCOPIC TUBE WITH WATER SUPPLY

BACKGROUND OF THE INVENTION

The present invention relates to a telescopic tube with water supply. It is mainly equipped with a minor tube, a major tube that are connected to each other by a tubular coupling device. The tubular coupling device has a registration end and a connecting section, the former is engaged with one end of the minor tube and the latter is engaged with the top end of the major tube. A guard cap is secured to the top end of the major tube which serves to prevent the minor tube from easy disengagement from the major tube in case of excessive extension adjustment. The connecting section of the tubular coupling device has a cone shaped configuration with a spiral thread track defined thereon and terminates in a stop board. A pair of support halves having tapered inner surface are movably registered with the spiral thread track and are outwardly expanded or retracted as moving against the cone shaped connecting section so that the outer surface of the support halves can be urged against the inner side of the major tube to hold the coupling device and the minor tube in place in length adjustment and vice versa for retraction of the telescopic tube. Thus the telescopic tube can be adjusted of its length and secured in place by simple rotation of the major tube and moving the minor tube to make the adjustment easy, speedy and precise.

Referring to FIG. 1, a conventional telescopic tube with water supply is made up of a locking retainer 10, a stopper 20, a coupler 30, a minor tube 40 and a major tube 50. The locking retainer 10 has an internally threaded section 11 and a cone shaped top through hole 12. The stopper 20 is a stepwise form with a through hole 21 at the center and has a small upper section 21 and a large bottom section 22. At the end of the small upper section 21 is defined a peripheral groove 221 for receiving a seal ring 222. There are a pair of peripheral protrusions 231 defined at the top and bottom end of the large bottom section 23 so as to permit a seal ring 232 to be placed in the groove formed therebetween. The coupler 30 is provided with a through hole having two sections having different diameters 31 and 32 so as to form a shoulder 33 at the joint thereof. On the external surface of the large diameter section 31 is disposed a protruded rib area and on the small diameter section 32 is disposed a threaded section 34 with a plurality of flexible claw pieces 35 separated by equally spaced splits 36. The minor tube 40 has a cleaning means 41 at one end which can be a sprinkler or a brush. The major tube 50 has a connector 51 having a connection head 511 with internal threads 512.

As shown in FIG. 2, the assembled telescopic tube can be adjusted of its length by extending or retracting the minor tube 40 with respect to the major tube 50 and then the locking retainer 10 is rotated tight to urge the flexible claw pieces 35 to firmly grasp the minor tube 40 in place. The other end of the major tube 50 is coupled to a water inlet duct so as to permit water to flow into the telescopic tube and discharged via the cleaning means 41.

Such a conventional telescopic tube has the following disadvantages in operation:
1. The locking retainer 10 must be rotated back and forth to make the length adjustment of the telescopic tube tedious and inconvenient.
2. The flexible claw pieces 35 are easily worn out and broken as a result of repeated usage, causing the coupler 30 having worn out thread section 34 unable to lock the minor tube 40 in position.
3. The locking retainer 10 and the coupler 30 are exposed externally and are broken easily in operation.

SUMMARY OF THE INVENTION

Therefore, the primary object of the present invention is to provide a telescopic tube with water supply the length of which can be adjusted by simply rotating the major tube and extending or retracting a minor tube and then rotating the major tube further in an opposite direction to get a pair of support halves having a tapered inner face in locking abutment against the major tube in an easy, speedy and precise manner.

Another object of the present invention is to provide a telescopic tube with water supply which is equipped with a tubular coupling device having a cone shaped connecting section on which is defined a spiral thread track. The two support halves each having a retaining blocks in registration with space defined on the gaps of the spiral thread track, and having a tapered inner face are used to get the two support halves fixed in place in abutment with the cone shaped connecting section so that the rotation of the major tube results in the tapered support halves moving upwardly or downwardly along the spiral thread track of the tubular coupling device to hold the minor tube in place with respect to the major tube without abrasion.

One further object of the present invention is to provide a telescopic tube with water supply having the tubular coupling device for coupling the major tube and the minor tube together and the two support halves concealed in the major tube so as to make the appearance appealing in one aspect and to protect the parts from easy damage in practical operation in another aspect.

DETAILED DESCRIPTION OF THE PREFERRED EMBODIMENT

Figure 1:
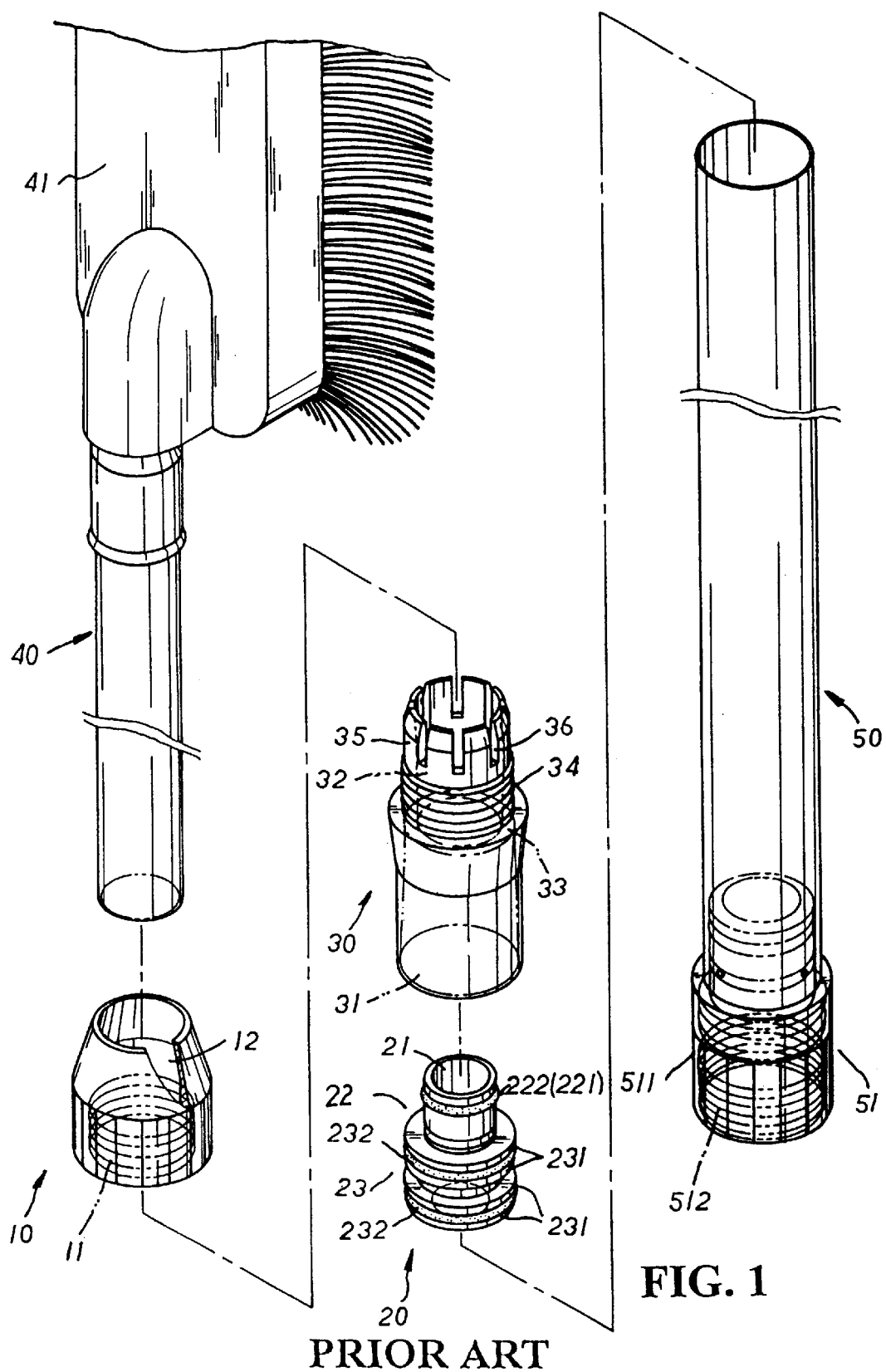
FIG. 1 is a perspective diagram showing the exploded components of the prior art telescopic tube.
Figure 2:
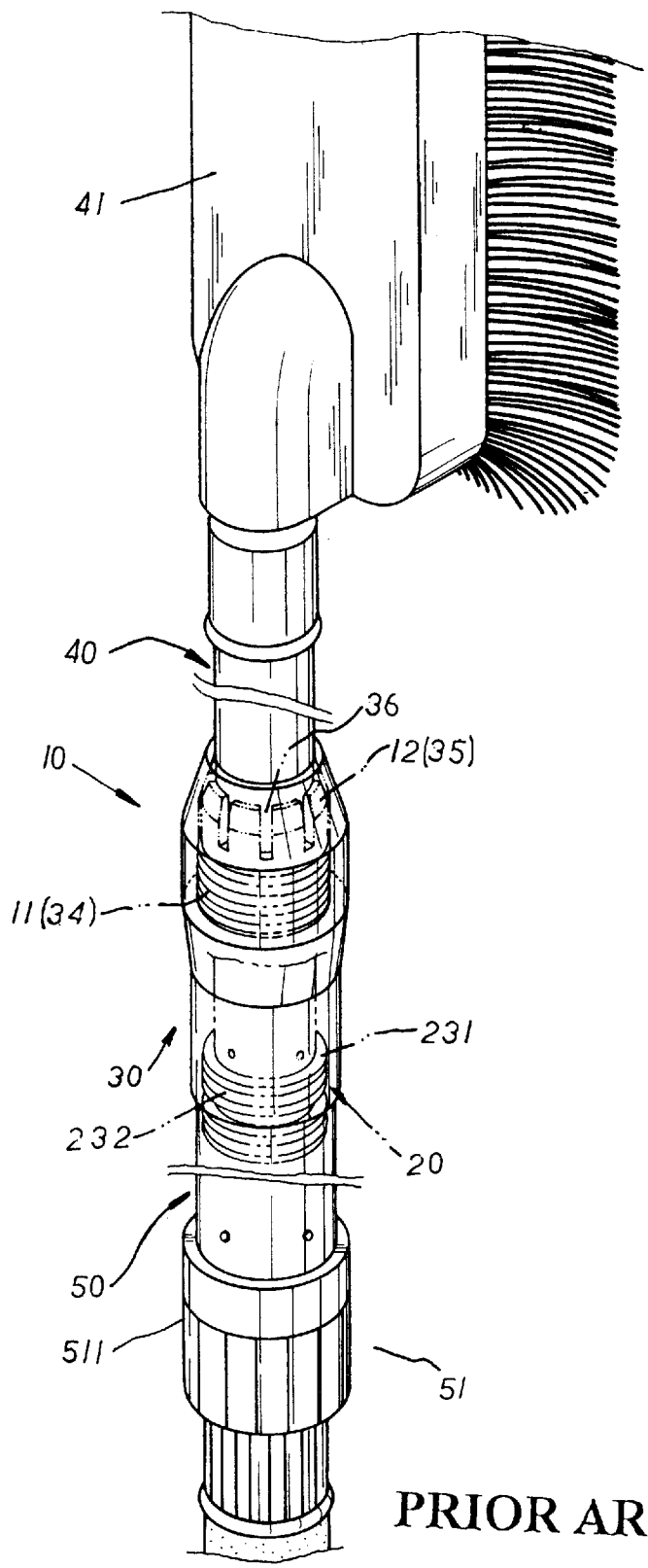
FIG. 2 is a sectional diagram showing the assembly of the conventional telescopic tube.
Figure 3:
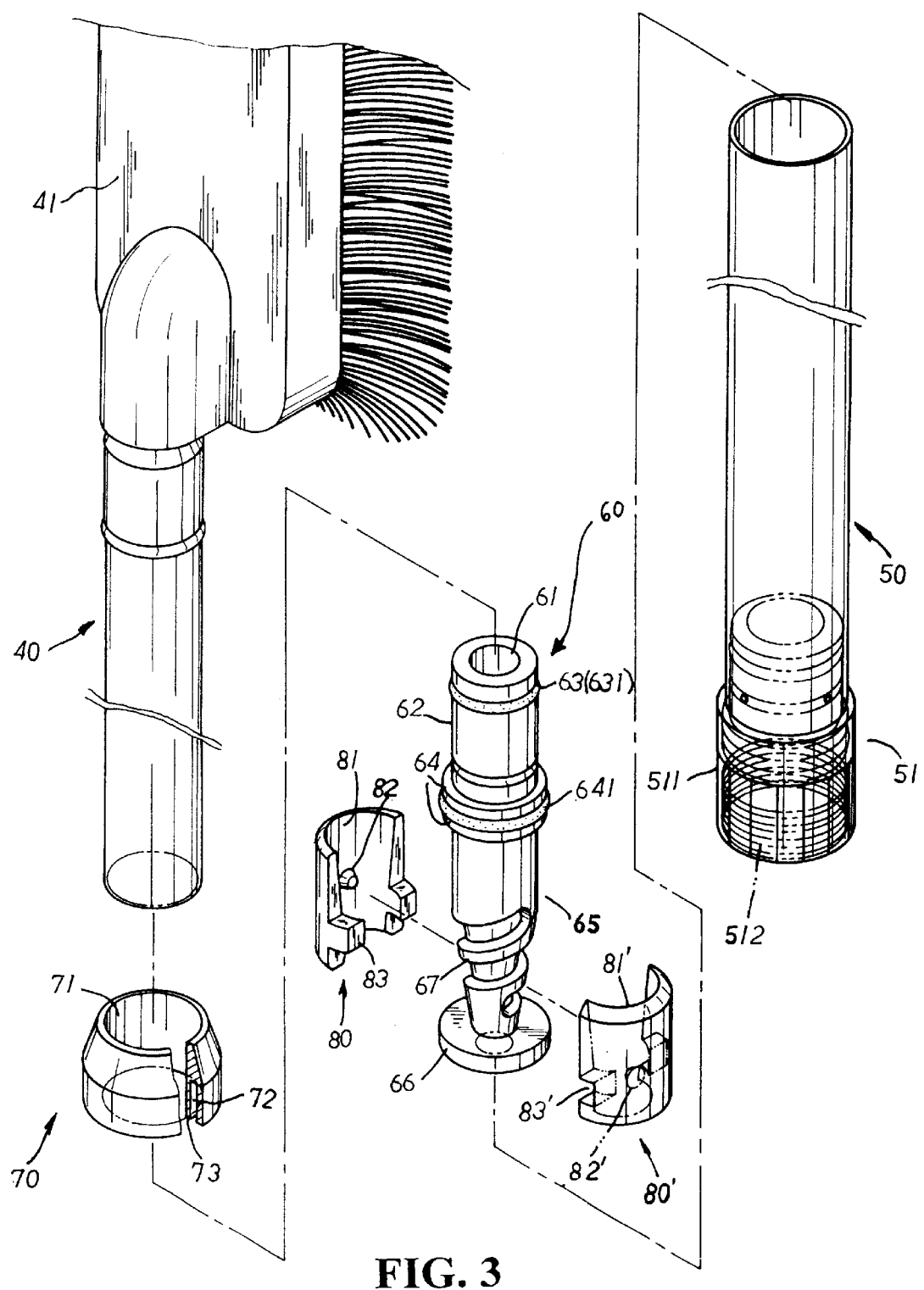
FIG. 3 is a perspective diagram showing the exploded components of the present invention.

Referring to FIG. 2 a telescopic tube with water supply comprises a coupling device 60, a guard cap 70, a pair of support halves 80, 80', a minor tube 40, a major tube 50.

The guard cap 70 is first attached to the minor tube 40 and then secured to the top end of the major tube 50. The coupling device 60 is fixed to one end of the minor tube 40 and engaged with a cleaning brush 41 which can be a sprinkler for option at the other end. The major tube 50 has a connecting assembly 51 equipped with a connector head 511 having an internally threaded surface 512.

The coupling device 60 provided with a central through hole 61 has a registration section 62 and a connecting section 65. The registration section 62 having a peripheral groove 63 with a seal ring 631 at one end and has a pair of protruded ring ribs 64 at the middle thereof with a seal ring 641 housed therein is fixedly engaged with one end of the minor tube 40.

The connecting section 65 of a cone shaped form has a horizontally placed round stop board 66 at its end. Extending from the stop board 66 upward the cone shaped connection section 65 gradually increases of its diameter and is provided with a spiral thread track 67 on the outer surface thereof.

The guard cap 70 has a central through hole 71 and a vertically peripherally defined registration recess 72 of a proper depth and a peripheral bottom abutment end 73 defined between the central through hole 71 and the registration recess 72.

The two support halves 80, 80' are integrally engageable with each other and each support half has a tapered, or upwardly expanded oblique inner surface 81 or 81'. At the center of each tapered inner face of the support halves 80. 80' is disposed a retaining protrusion 82, 82' respectively. The support half 80 has a registration block 83 on each of the two opposite edges thereof and the other support half 80' is provided with a registration cavity 83' in correspondence to the registration block 83 so as to permit the two support halves 80, 80' to be in locking engagement with each other.

Figure 4:
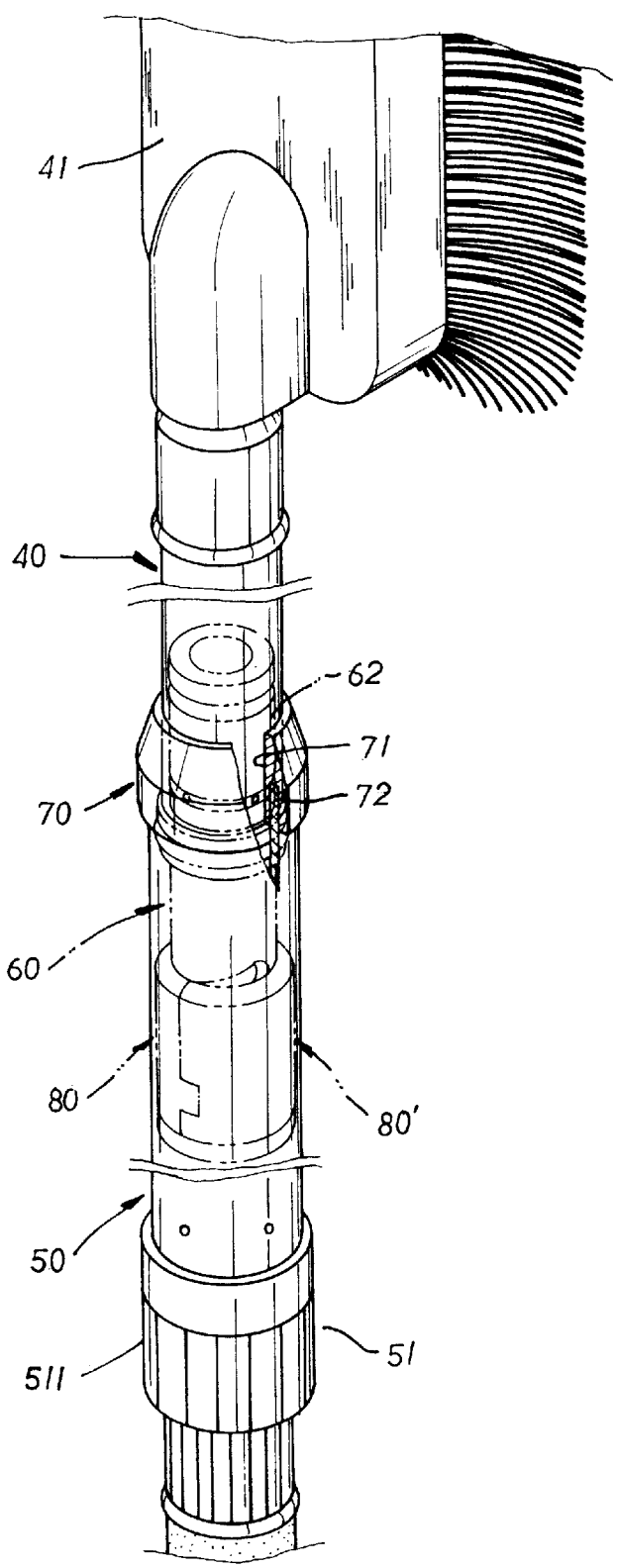
FIG. 4 is a perspective diagram showing the assembly of the telescopic tube of the present invention.
Figure 5:
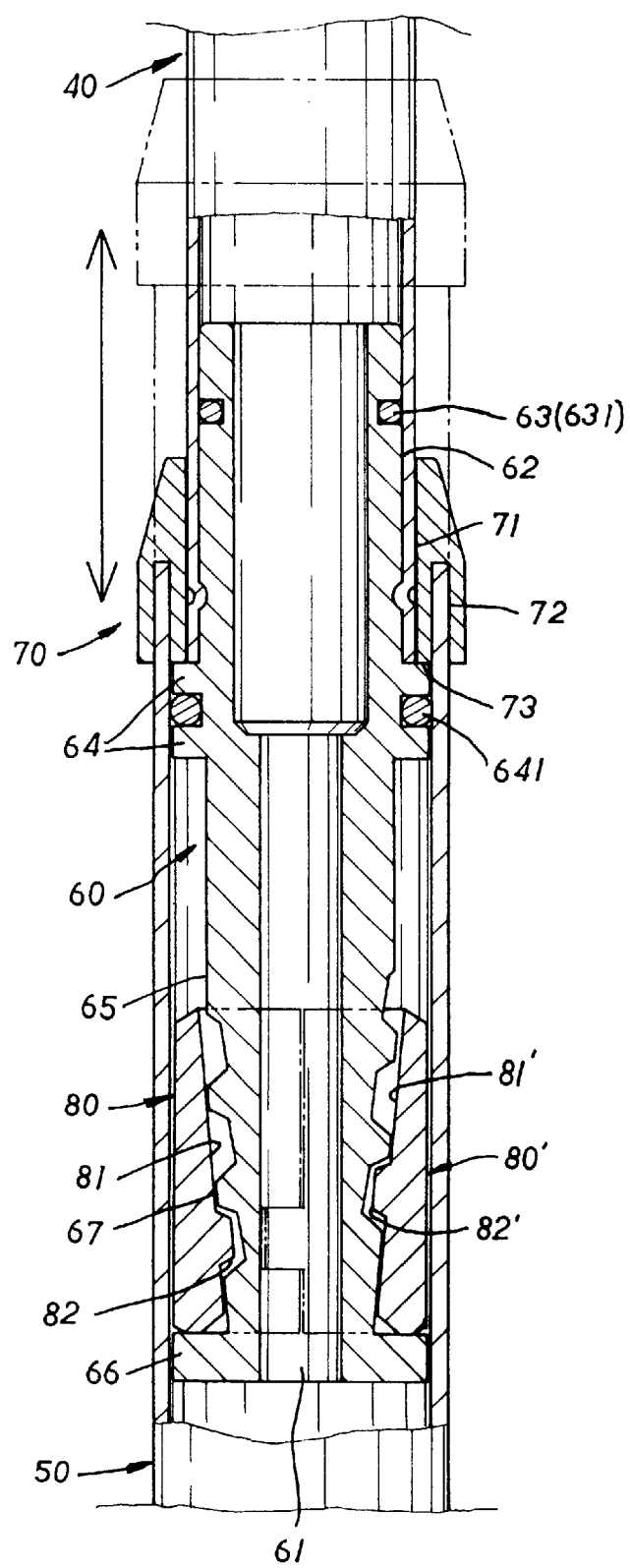
FIG. 5 is a sectional diagram showing the adjustment of the length of the tube of the present invention.

In assembly, as shown in FIGS. 4, 5, the guard cap 70 is registered with the minor tube 40 by way of the central through hole 71. The coupling device 60 is in insertion engagement with the minor tube 40 at the registration section 62 with the protruded ring ribs 64 in abutment against the inner surface of the minor tube and the seal ring 641 and the seal ring 631 at the top end of the registration section 62 are in further sealing abutment with the inner surface of the minor tube 40 to avoid leakage. At the opening end of the minor tube 40 are disposed a number of protruded spots (not shown) which can assure a firm connection of the minor tube 40 to the registration section 62. The two support halves 80, 80' are integrated at the spiral thread track 67 of the connection section 65 of the coupling device 60 with the registration blocks 83 engaged with the registration cavities 83'. Now the two support halves 80, 80' have their bottom end in abutment against the upper side of the stop board 66 and the inner surfaces thereof in abutment with the peripheral surface of the spiral thread track 67 and the retaining protrusions 82, 82' are registered with the spiral extended space of the track 67. Then the end of the major tube 50 is engaged with the minor tube 40 from the end of the coupling device 60 with the two support halves 80, 80'. The inner surface of the major tube 50 is in slight contact with the outer surface of the two support halves 80, 80' and the peripheral registration recess 72 defined at the bottom of the guard cap 70 is in insertion engagement with the top end of the major tube 50. The seal ring 641 and the two ring ribs 64 of the coupling device 60 are in close contact with the inner surface of the major tube 50 to prevent leakage. The bottom abutment end 73 of the guard cap 70 secured to the top end of the major tube 50 can be in limiting engagement with the protruded ring rib 64 so as to prevent the disengagement of the major tube 50 from the minor tube 40 when excessive extension of the minor tube 40 takes place.

Figure 6:
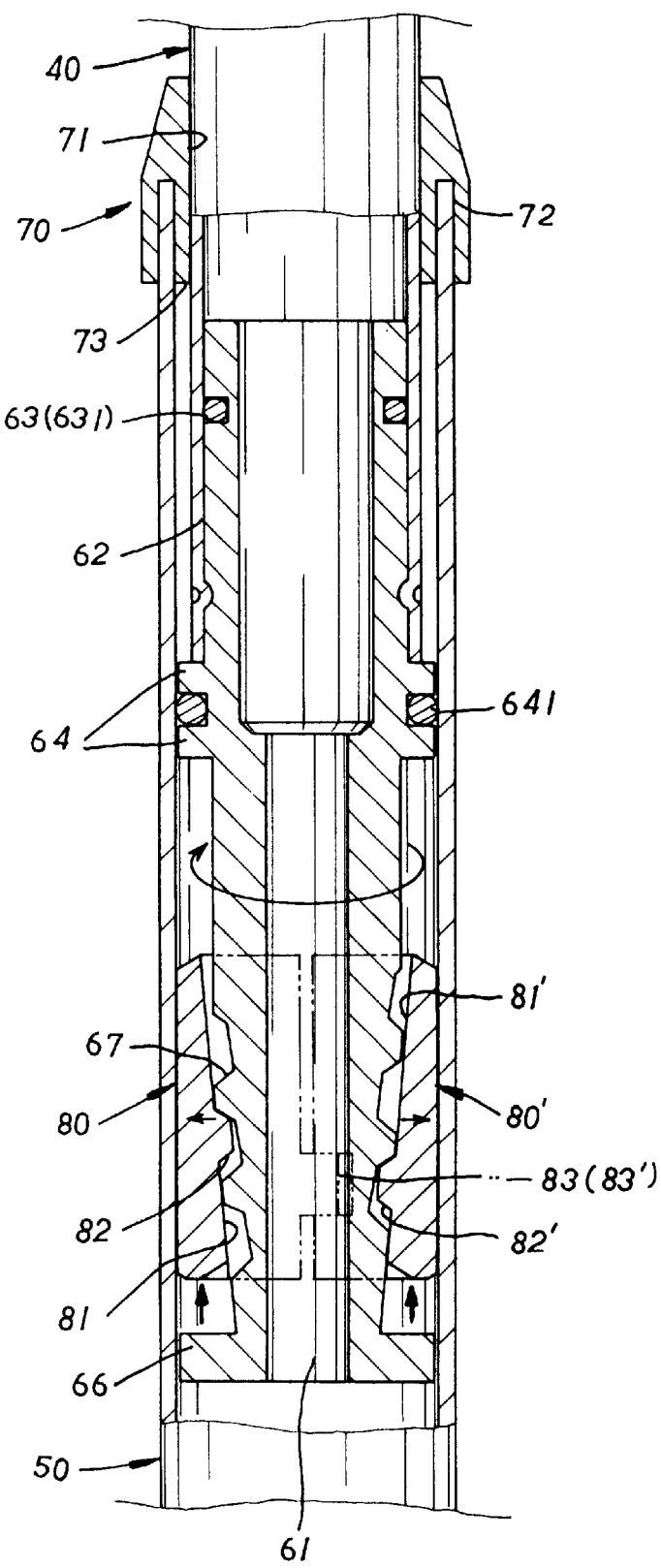
FIG. 6 is a sectional diagram showing the lift up of the coupling device and the minor tube in adjustment thereof.

Referring to FIG. 6, the sectional diagram illustrates the adjustment of the length of the major tube 50 and the minor tube 40 of the telescopic tube of the present invention wherein as the major tube 50 is directly rotated in one selected direction, causing said support halves 80, 80' mounted to the coupling means 60 fixed to the end of the minor tube 40 to spin and move along the spiral thread track 67 on the coupling device 60 either upwardly or downwardly so as to permit the coupling device 60 and the minor tube 40 to extend or retract in adjustment to a desired position; at this moment, get the major 50 tube rotated in another direction the gradually upwardly expanded tapered inner surface of the support halves 80, 80' moves along the outer surface of the upwardly expanded cone-shaped spiral thread track 67 of the connection section 65 so as to make the support halves 80, 80' to expand outwardly with the external surface thereof forcing against the inner surface of the major tube 50 whereby the major tube 50 and the minor tube 40 can be adjusted of their relative length and fixed in position by the coupling device 60 and the support halves 80, 80' with ease, speed and precision in one operation.

In operation, the connector head 511 of the connecting assembly 51 of the major tube 50 can be engaged with a water conduct connected to a water source by way of the internally threaded section 512. Then a water supply switch is switched on to let water flow through the major tube 50 and further the through hole 61 of the coupling device 60 and the minor tube 40 so that the cleaning brush 41 secured to the end of the minor tube 40 can get things cleaned with continual water supply.

What is claimed is:

1. A telescopic tube with water supply, comprising:

a coupling device, a guard cap, a pair of support halves, a minor tube, a major tube; said guard cap being first attached to said minor tube and then secured to a top end of said major tube, said coupling device being fixed to one end of said minor tube and engaged with a cleaning means at the other end, said major tube having a connector assembly;

wherein said coupling device has a registration section and a connecting section; said registration section is fixedly engaged with one end of said minor tube; said connecting section of a cone shaped form is provided with a spiral thread track on an outer surface thereof for close registration with a tapered inner face of each of said support halves with a retaining block on said tapered inner surface of each said support halves registered with a space defined by said spiral thread track; one end of said major tube is in inserting registration with said minor tube at the end with said support halves so as to permit said coupling device engaged with one end of said minor tube to be housed in said major tube with an inner surface of said major tube in slight contact with an outer surface of said support halves whereby as the length of said major tube and said minor tube in combination is to be adjusted, said major tube is directly rotated, causing said support halves to move along said spiral thread track on said coupling device either upwardly or downwardly to lock said coupling device in place against said major tube such that said major tube is free to extend or retract with said minor tube to a desired position in adjustment and then lock said coupling device in place in the same manner.

2. The telescopic tube as claimed in claim 1 wherein said coupling device has a central through hole and is provided with a peripheral cavity defined at a connection section for housing a seal ring and at a middle of said coupling device are disposed a pair of peripheral ring ribs with a seal ring disposed therebetween and a horizontal stop board is disposed at the bottom of said coupling device.

3. The telescopic tube as claimed in claim 2 wherein said cone shaped connecting section of said coupling device increases of its diameter from said bottom stop board upwardly.

4. The telescopic tube as claimed in claim 1 wherein said cone shaped connecting section of said coupling device increases of its diameter from said bottom stop board upwardly.

5. The telescopic tube as claimed in claim 1 wherein said guard cap has a central through hole and has a vertical peripheral recess for registration with one end of said major tube and a peripheral end surface between said central through hole and said peripheral recess serves as a limiting abutment surface.

6. The telescopic tube as claimed in claim 1 wherein said two support halves have respectively an inner abutment surface which has an upwardly expanded oblique slope; one of said support halves has a pair of registration blocks and the other has a pair of corresponding registration cavities so that said two support halves are in locking registration with each other in assembly with said registration blocks registered with said registration cavities.

7. The telescopic tube as claimed in claim 1 wherein said coupling device and said support halves are applied either to the coupling of metal tubes or plastic tubes.

* * * * *